United States Patent [19]

Schlatter et al.

[11] 4,250,220
[45] Feb. 10, 1981

[54] COMPOSITE PANEL WITH TWO OUTER LAYERS AND A CENTRAL CORE

[75] Inventors: Reinhard Schlatter; Arnold Grass, both of Schaffhausen, Switzerland

[73] Assignee: Swiss Aluminium Ltd., Chippis, Switzerland

[21] Appl. No.: 66,069

[22] Filed: Aug. 13, 1979

[30] Foreign Application Priority Data

Aug. 31, 1978 [CH] Switzerland .................. 9195/78

[51] Int. Cl.$^3$ .............................................. B32B 5/16
[52] U.S. Cl. .............................. 428/212; 106/18.11; 106/18.26; 428/220; 428/329; 428/332; 428/920; 428/921
[58] Field of Search ............... 428/68, 70, 71, 74, 428/220, 323, 328, 921, 329, 212; 156/62.2; 106/18.11, 18.26, 287.17, 290, 308 Q

[56] References Cited

U.S. PATENT DOCUMENTS

| 3,137,612 | 6/1964 | Chu et al. ............... 428/328 |
| 3,549,474 | 12/1970 | Lonning ................ 428/921 |
| 3,703,385 | 11/1972 | Zwickert ............... 428/921 |
| 3,827,997 | 8/1974 | Bergomi ............... 428/921 |
| 4,032,393 | 6/1977 | Alfeis et al. .......... 428/920 |
| 4,076,580 | 2/1978 | Panusch et al. ....... 428/328 |

FOREIGN PATENT DOCUMENTS

| 2165307 | 3/1973 | France ................... 428/326 |
| 50-22586 | 7/1975 | Japan ................... 106/18.26 |

*Primary Examiner*—Paul J. Thibodeau
*Attorney, Agent, or Firm*—Bachman and LaPointe

[57] ABSTRACT

The present invention concerns a composite panel with two cover sheets and between these a core made from a mixture of a granular filler material and a binding agent. The resultant panel meets the requirements governing incombustible building components in various countries, and can therefore be put in the class of incombustible building components.

The core material used in known composite panels can be inorganic and incombustible, but all such composite panels known to date suffer from severe disadvantages.

To avoid these disadvantages 100 parts by weight of the core material of the panel contains: 85–95 wt % of granular filler material which has an average particle size of over 100 μm and at least 50 wt % Al(OH)$_3$ and 5–15 wt % of a binding agent.

7 Claims, No Drawings

COMPOSITE PANEL WITH TWO OUTER LAYERS AND A CENTRAL CORE

BACKGROUND OF THE INVENTION

The present invention relates to a composite panel which has two outer layers and between these a core comprising a mixture of a granular filler material and an adhesive.

Composite panels of the above mentioned kind, comprising metallic or non-metallic cover sheets joined over their whole inner surfaces by means of an adhesive to a central, inorganic core, are already known. The core materials used in the known composite panels can be inorganic and incombustible. All such composites known to date suffer, however, from certain fundamental disadvantages.

Inorganic core materials and adhesives are indeed incombustible but, because they lack elasticity, they are not able to withstand the deformation resulting from mechanical stressing or thermal dilation of the outer layers. The outer layers of such composites therefore decohere or delaminate in a brittle manner. Also they are usually sensitive to water vapor, or they absorb moisture, which can then lead to corrosion of the metallic cover sheets, in particular if used in connection with alkaline substances.

If the inorganic core materials contain hard mineral components or asbestos fibers, machining operations such as sawing and drilling can be carried out only with special tools; the machining may also be made more difficult by the formation of dust containing components which could be toxic.

Organic or mainly organic materials such as core compositions which have plastics in their make up can not provide the non-combustibility required, as the effect of fire or high temperatures causes large quantities of combustible gases to be released as a result of the decomposition of organic components.

It is known that the combustibility of organic substances such as artificial resins can be reduced significantly by the inclusion of the maximum possible amounts of aluminum hydroxide Al(OH)$_3$ or hydrated aluminum oxide.

The effect here is due partly to the reduction in the calorific value per kg of mixture, corresponding to the amount of filler material added. Another factor is that approx., 1880 kJ of energy per kg Al(OH)$_3$ is used to dehydrate and heat up Al(OH)$_3$ which contains up to 33 wt% of chemically bonded water i.e. as in the equation

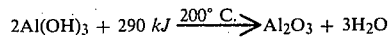

$$2Al(OH)_3 + 290 \, kJ \xrightarrow{200°\,C.} Al_2O_3 + 3H_2O$$

Furthermore, the water vapor acts as a protective gas, excluding oxygen from the region of combustion. The formation of a surface layer of filler material and carbonized products also protects and insulates the lower lying layers from the source of ignition and therefore reduces further the decomposition into combustible products.

In many countries criteria have been worked out and standardized to allow materials containing only small amounts of organic substances to be classified as non-combustible building materials or components. In Germany for example, to meet the requirements for classification as non-combustible, it must be shown (in accordance with the German Specification DIN 4102) that the lower calorific value of the building material is not more than 4200 kJ/kg of material or, in building components, the quantity of heat given off under first test conditions is less than 16,800 kJ/m$^2$. In Switzerland and France the evidence for incombustibility and the classification for incombustible components are based on similar conditions.

The object of the present invention is to develop a composite panel which can be judged as being in the class of non-combustible building components in terms of the criteria and specifications worked out by the above mentioned countries, and by means of which at the same time the above mentioned disadvantages associated with the known composite panels using inorganic core materials and adhesives are avoided.

SUMMARY OF THE INVENTION

This object is achieved by way of the invention in that 100 parts by weight of core material contains 5–15 wt% binding agent and 85–95 wt% granular filler material which has an average particle size of over 100 μm and comprises at least 50 wt% Al(OH)$_3$. The mixture of the filler material for the core has an average particle size of more than 100 μm. Usefully, it is now possible to work a sufficiently high proportion of Al(OH)$_3$ into a solvent-free plastic to fulfil the criteria for non-combustibility, and simultaneously to satisfy the strength and elasticity requirements for a composite-core material of the desired thickness of preferably 2–10 mm, thus avoiding the disadvantages exhibited by the known non-combustible composite panels. Further advantages accruing from the invention are made clear in the following description.

DETAILED DESCRIPTION

The desired density of Al(OH)$_3$ filler material is achieved by way of the invention by means of a special distribution of the extremely small amount of binding agent, and making use of a definite structural arrangement and granulometry of the Al(OH)$_3$ particles and an amount of binding agent which decreases throughout the core from the interface with the outer sheets to the center of the core. This way it is possible to achieve packing densities or ratios of Al(OH)$_3$ filler material and binding agent which are not possible with commercially available qualities of Al(OH)$_3$ in a particle size range below 100 μm as a result of these surface being too wettable or because of insufficient binding forces and elastic properties. By providing a binding agent which decreases in quantity from the interface between the outer sheet and the core towards the less highly stressed neutral center of the core, one achieves simultaneously and in an optimum way good adhesion between the outer sheet and the core and also strengthening of the outer-lying part of the core i.e. the part most highly stressed when the panel is subjected to bending forces.

One can employ for the composite panel of the invention granular material obtained from natural disintegration by breaking. After sieving washing and drying it comprises at least 50 wt% Al(OH)$_3$ i.e., with a loss on ignition of the dry substance equal to at least 17.5 wt% for an average particle size of more than 100 μm. Pure granular Al(OH)$_3$, obtained from the industrial Bayer process can also be employed. This can be agglomerated, or else precipitated as a fine powder and then possibly compacted in a special process to exhibit an apparent density of at least 2.2 g/cm³ and a loss on ignition of up to 34.6%. Also, for an optimum packing density, the particle distribution of the aluminum hydroxide can be worked out approx., using the minimum spaces principle and Fuller's law viz., $$\text{Fraction of Grain size } X = \frac{100 \cdot \text{Grain size } X}{\text{Max grain diameter}}$$

To achieve optimum strength, in particular resistance to bending forces, the granular aluminum hydroxide used is one in which the granules exhibit the highest possible fracture strength.

The binding agents used are liquid, organic mixtures of resins based on reactive artificial resin monomers, pre-polymerides or mixtures of these which harden as a result of polymerization reactions to form polyester, polyurethane, epoxy, or polymethylmethacrylate polymers.

The composite panels of the invention can be manufactured for example in the following manner.

The upper and lower cover sheets are coated each on one side with 5–40% of the total amount of binding agent. Then, using a suitable mixing device, the granular aluminum hydroxide, which is free-running or can be transported by shaking or vibrating, is mixed intimately with the rest of the binding agent and deposited uniformly on the lower cover sheet. The upper cover sheet is then placed on top and the whole compressed between plates which can be heated and the binding agent allowed to harden. In the course of this process some of the binding agent applied to the cover sheets penetrates the outer part of the core between the particles of aluminum hydroxide and results in the amount of binding agent being greater in the outer parts of the core and decreasing towards the center of the core.

EXAMPLE 1

The core mixture was obtained by taking 10 kg of crushed bauxite, sieving, washing and drying it to obtain a granular mass with the following properties:
Particle size distribution
⅓—0.1–1 mm
⅓—1–2 mm
⅓—2–3 mm
Apparent density of the grains: 2.4 g/cm³
Loss on ignition: 25 wt%
Al(OH)₃ content (theoretical): 72.2 wt%
This granular mass was mixed thoroughly for 1 minute with a 1 kg liquid reaction mixture of polyurethane made up of 442 g polyestertriol with a hydroxyl number of 450–500 and 552 g of a mixture of polyisocyanate and approximately 90% di-phenylmethane, 4.4' diisocyanate (MDI) and an NCO content of 30–32% intimately mixed with 6 g di-butyl-tin-di-laurate as catalyst. This core mixture was uniformly distributed between two 1.5 m² cover sheets each of which had previously been coated with 100 g/m² of the same fluid polyurethane reaction mixture. Finally the cover sheets, with the core between them, were subjected to a pressure of 10 N/cm² at 80° C. for 15 min and the core allowed to harden.

Composite panels manufactured this way exhibit, compared with panels made the same way but with ordinary sand and the same particle size distribution, the following properties which are relevant with respect to combustibility:
1. Lower calorific value of the core (a) with bauxite as filler=1850 kJ/kg or 12,980 kJ/m² for a 5 mm thick core (7 kg/m²)
(b) with sand as filler=2,960 kJ/kg or 25,160 kJ/m² for a 5 mm thick core (8.5 kg/m²)
2. Combustibility in the laboratory testing facility; testing the core 7×190×450 mm, vertical (long edge) and without cover sheets; 5 min direct application of 2 Bunsen burners to the lower edge of the sample.
Results:
(a) Bauxite as filler
max. temperature of fumes 280° C.
weight loss 6.4%
no afterburning
(b) Sand as filler
max. temperature of fumes 500° C.
Afterburning until total decomposition of the sample

EXAMPLE II

The following procedure was taken for the preparation of the core: 1.5 kg of coarsely precipitated, low alkali aluminum hydroxide with a major part of its grain size at 100±20 μm was taken together with 3.5 kg of granular aluminum hydroxide (particle size 0.2–1 mm) compacted in a special process to a density of at least 2.2 g/cm². Al(OH)₃ granules (1–3 mm) were prepared in the same way and the whole mixed for 1 minute with 1 kg of the polyurethane reaction mixture as described in the first example.

The core mixture was uniformly distributed between two cover sheets each of which had previously been coated on the inside faces with 150 g/m² of an elastic two-component polyurethane adhesive containing 50% of a filler material. The whole composite was then allowed to harden in a hot press by applying a compressive load of 10 N/cm² for 10 min at 80° C.

After removing the cover sheets, the core of this panel was 5 mm thick and weighed 6.7 kg/m². The lower calorific value of this core was 1005 kJ/kg or 6,700 kJ/m².

What is claimed is:

1. Composite panel with two cover sheets and a core therebetween and bonded thereto, wherein the core comprises a mixture of granular filler material and an organic binding agent, in which 100 parts by weight of core material is made up of 5–15 weight percent binding agent and 85–95 weight percent granular filler material which has an average grain diameter of more than 100 microns and contains at least 50 weight percent Al(OH)₃, wherein the amount of binding agent decreases from the cover sheet towards the center of the core, wherein said panel is incombustible and is characterized by good strength and elasticity and good adhesion between the cover sheets and the core.

2. Composite panel according to claim 1 in which a part of the total amount of binding agent is applied to the inside faces of the cover sheets to improve adhesion and the strength of the composite, as a result of which the amount of binding agent decreases from the cover sheet towards the center of the core.

3. Composite panel according to claim 1 in which the core material contains fibers.

4. Composite panel according to claim 1 in which the binding agent is an organic reaction mixture hardened during the manufacture of the panel by a polymerization reaction of fluid components.

5. Composite panel according to claim 1 having a thickness of from 2 to 10 mm.

6. Composite panel according to claim 4 wherein said polymerization reaction forms a polymer selected from the group consisting of polyester, polyurethane, epoxy and polymethyl-methacrylate.

7. Composite panel according to claim 2 wherein 5–40% of the total amount of binding agent is applied to the inside faces of the cover sheets.

* * * * *